US012754802B2

(12) United States Patent
Kumar et al.

(10) Patent No.: US 12,754,802 B2
(45) Date of Patent: Oct. 6, 2026

(54) METHOD FOR DETECTING AND RECOVERING AN INOPERABLE DRIVE

(71) Applicant: SANDISK TECHNOLOGIES, INC., San Jose, CA (US)

(72) Inventors: Shiva Kumar, Bangalore (IN); Ramanathan Muthiah, Bangalore (IN)

(73) Assignee: SANDISK TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 18/511,724

(22) Filed: Nov. 16, 2023

(65) Prior Publication Data

US 2025/0165345 A1 May 22, 2025

(51) Int. Cl.
*G06F 11/14* (2026.01)

(52) U.S. Cl.
CPC .... *G06F 11/1417* (2013.01); *G06F 2201/805* (2013.01)

(58) Field of Classification Search
CPC ............. G06F 11/1417; G06F 11/1441; G06F 11/1428; G06F 3/0632; G06F 9/4401
See application file for complete search history.

(56) References Cited

U.S. PATENT DOCUMENTS 9,329,931 B2 * 5/2016 Canepa ............... G06F 11/1008
10,761,937 B2 9/2020 Lappi
11,455,115 B2 9/2022 Futagi
11,789,819 B1 * 10/2023 Simionescu ........... G11C 29/50 714/6.11
2020/0225858 A1 * 7/2020 Kim ...................... G06F 3/0604
2021/0042035 A1 * 2/2021 Futagi ................. G06F 11/1417
2021/0240371 A1 8/2021 Rajagopalan
2022/0179744 A1 * 6/2022 Byun .................. G06F 11/1417
2023/0146266 A1 * 5/2023 Choi .................. G06F 11/1441 714/15
2023/0315587 A1 * 10/2023 Sugino ................ G06F 11/0727 714/2

* cited by examiner

*Primary Examiner* — Yolanda L Wilson
(74) *Attorney, Agent, or Firm* — Arlene P. Neal; NEAL BLIBO LLC

(57) ABSTRACT

A storage device may recover from a firmware failure that places the storage device in an undetectable state. The storage device includes a memory device to store recovery firmware. A storage device controller includes a failure detector module that may identify the firmware failure when a periodic signal is not received by the failure detector module from a firmware thread, when the failure detector module determines that an initialization counter value is greater than an initialization threshold, or when the failure detector module receives a notification of a predefined number of power cycle events occurring with a given time frame. Upon identifying the firmware failure, the failure detector module updates a boot address. A recovery module May obtain recovery firmware from the memory device, based on the boot address, to recover the storage device in a recovery mode, and perform phased recovery actions to restart the storage device.

19 Claims, 9 Drawing Sheets

METHOD FOR DETECTING AND RECOVERING AN INOPERABLE DRIVE

BACKGROUND

A storage device may be communicatively coupled to a host and to non-volatile memory including, for example, a NAND flash memory device on which the storage device may store data received from the host. The storage device may include firmware for control of operations on the storage device. While the storage device is in use, the firmware execution may fail to progress due to an unexpected situation. For example, the firmware execution may fail due to an unexpected memory response that cannot be handled by the firmware, memory corruption, or an error, flaw, or fault in the design, development, or operation of the firmware. The firmware may operate in a multi-threaded and multi-core environment and the firmware execution may also fail when there are deadlocks between firmware modules. In cases where data is still present on the storage device after a firmware failure, the data may be compromised.

When firmware failures occur, the storage device may become non-functional and enter a non-detectable or brick state, wherein the storage device may be unusable to the host. In some cases, when firmware failures occur, the storage device may be detectable by the host for a brief period. However, when the host begins communications with the storage device, the storage device may enter a non-detectable or brick state. When the storage device is not detectable or the storage device is not responding to host commands, the host may power cycle the storage device multiple time to remove the device from the brick state and/or establish persistent connection with the storage device. If the host is unable to revive the storage device after multiple attempts, the host may determine that the storage device has failed, which may result in replacement of the storage device. In addition, when the host is unable to communicate with the storage device, the host may be unable to recover data stored on the memory device.

SUMMARY

In some implementations, the storage device may recover from a firmware failure that places the storage device in an undetectable state. The storage device includes a memory device to store recovery firmware and a controller. The controller includes a failure detector module that may identify the firmware failure when a periodic signal is not received by the failure detector module from a firmware thread, when the failure detector module determines that an initialization counter value is greater than an initialization threshold, or when the failure detector module receives a notification of a predefined number of power cycle events occurring with a given time frame. The failure detector module updates a boot address. The controller also includes a recovery module to obtain recovery firmware from the memory device, based on the boot address, to recover the storage device in a recovery mode and perform phased recovery actions to restart the storage device.

In some implementations, a method is provided for recovering from a firmware failure that places the storage device from an undetectable state. The method includes identifying a firmware failure when a periodic signal is not received by a failure detector module from a firmware thread, when an initialization counter value is greater than an initialization threshold, or when a notification is received of a predefined number of power cycle events occurring with a given time frame. The method also includes updating a boot address and obtaining recovery firmware from the memory device based on an updated boot address. The method further includes recovering the storage device in a recovery mode with the recovery firmware and performing phased recovery actions to restart the storage device.

In some implementations, a method is provided for recovering from a firmware failure that places the storage device from an undetectable state. The method includes identifying a firmware failure when a periodic signal is not received by a failure detector module from a firmware thread, when an initialization counter value is greater than an initialization threshold, or when a notification is received of a predefined number of power cycle events occurring with a given time frame. The method also includes updating a boot address and obtaining recovery firmware from the memory device based on an updated boot address. The method further includes recovering the storage device in a recovery mode with the recovery firmware, executing a light mount of the recovery firmware to restart the storage device and enter a temporary read-only mode to enable a host to back-up data stored on the storage device, and executing a first recovery attempt by exiting the read-only mode to allow read and write operations. If the first recovery attempt fails, the method further includes executing a second recovery attempt by sending logical-to-physical tables to the host, erasing the logical-to-physical tables on the storage device, and retrieving the logical-to-physical tables from the host to allow read and write operations.

Figure 1:
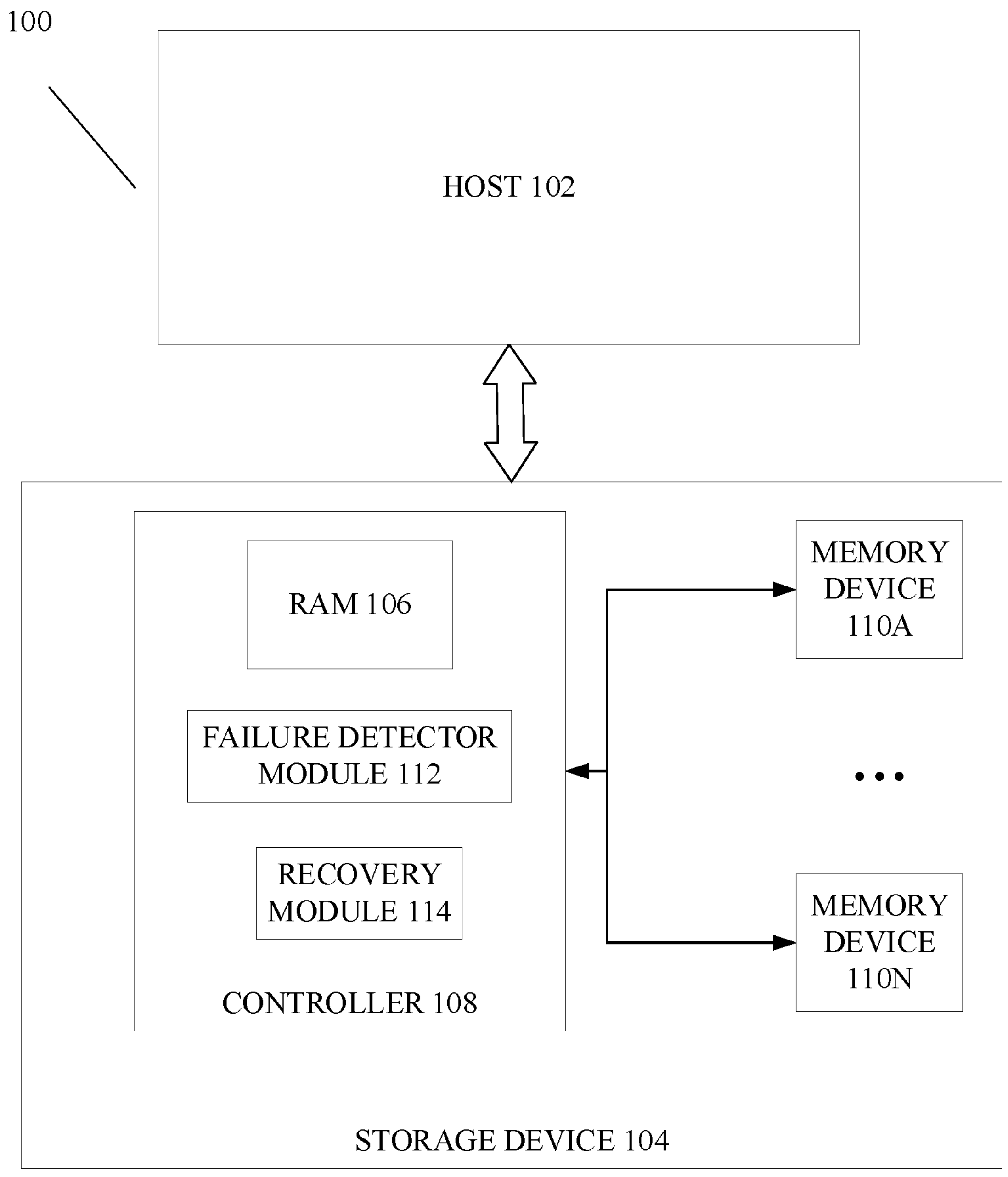
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with some implementations. System 100 includes a host 102 and a storage device 104. Host 102 and storage device 104 may be in the same physical location as components on a single computing device or on different computing devices that are communicatively coupled. Storage device 104, in various embodiments, may be disposed in one or more different locations relative to the host 102. System 100 may include additional components (not shown in this figure for the sake of simplicity).

Storage device 104 may include a random-access memory (RAM) 106, a controller 108, one or more non-volatile memory devices 110*a*-110*n* (referred to herein as the memory device(s) 110), a failure detector module 112, and a recovery module 114. Storage device 104 may be, for example, a solid-state drive (SSD), and the like. RAM 106 may be temporary storage such as a dynamic RAM (DRAM) that may be used to cache information in storage device 104.

Failure detector module 112 may assist in detecting inoperable conditions on storage device 104. Recovery module 114 may perform recover operations on storage device 104 with recovery firmware. The recovery firmware may include a light/lightweight recovery firmware for recovering storage device 104 with minimum firmware mount operations so as to recover storage device 104 from a brick state to a read-only mode, or to optionally enable a field firmware update. After the field firmware update, recovery module 114 may boot up storage device 104 in a normal mode, wherein hardware protocols and other firmware features that are not enabled in the read-only mode may be mounted and initialized to resume normal operations on storage device 104.

Memory device 110 may be flash based. For example, memory device 110 may be a NAND flash memory that may be used for storing host and control data over the operational life of memory device 110. Memory device 110 may be included in storage device 104 or may be otherwise communicatively coupled to storage device 104. Memory device 110 may be divided into blocks and data may be stored in the blocks in various formats, with the formats being defined by the number of bits that may be stored per memory cell.

Controller 108 may interface with host 102 and process foreground operations including instructions transmitted from host 102. For example, controller 108 may read data from and/or write to memory device 110 based on instructions received from host 102. Controller 108 may further execute background operations to manage resources on memory device 110. For example, controller 108 may monitor memory device 110 and may execute garbage collection and other relocation functions per internal relocation algorithms to refresh and/or relocate the data on memory device 110. FIG. 1 is provided as an example. Other examples may differ from what is described in FIG. 1.

Figure 2:
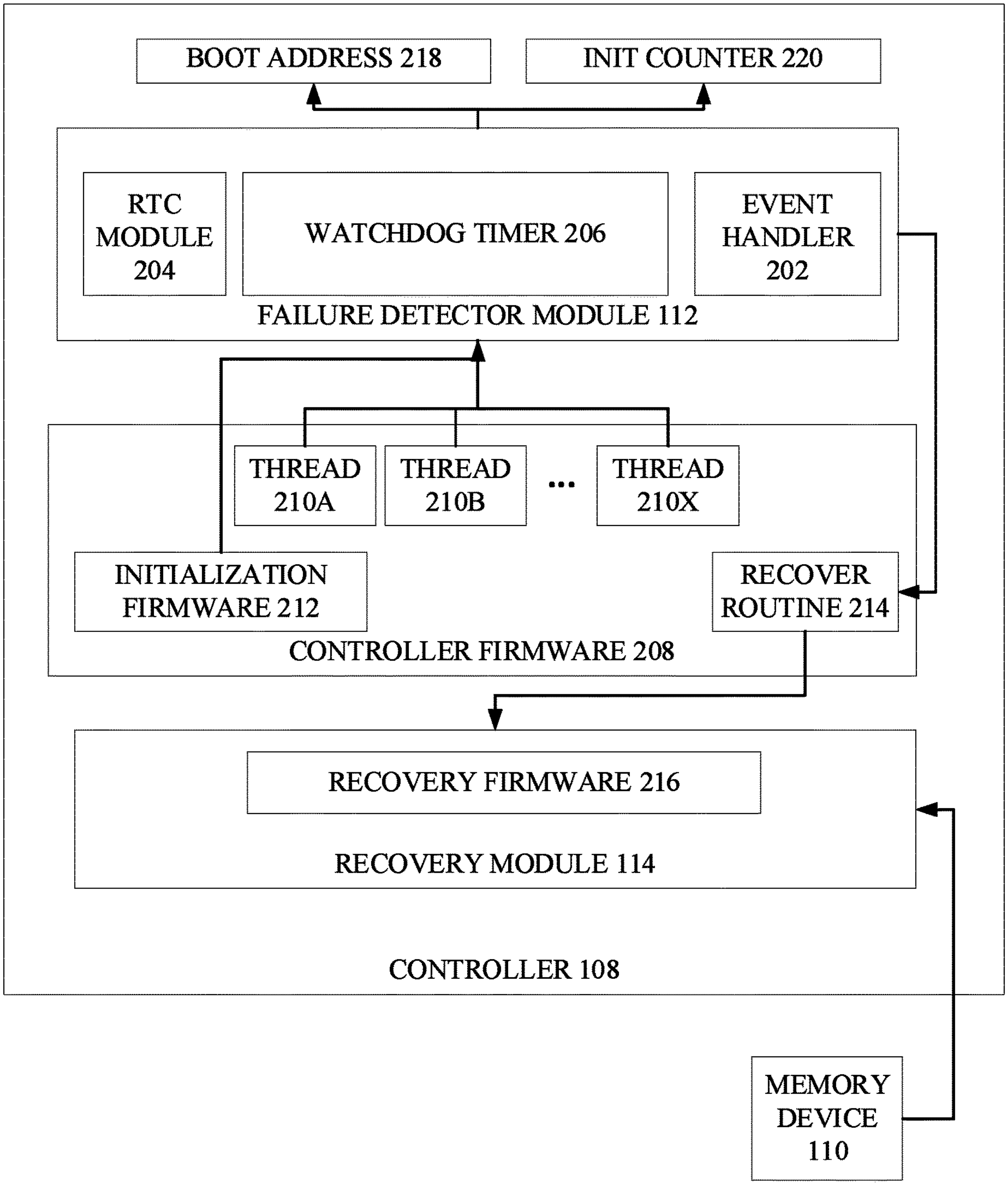
FIG. 2 is a block diagram of an exemplary controller in a storage device in accordance with some implementations.

FIG. 2 is a block diagram of an exemplary controller in a storage device in accordance with some implementations. Controller firmware 208 may be multi-threaded with a multi-core architecture (as shown, for example, firmware threads 210A-210X, and generally referred to herein as firmware thread 210). Each firmware thread/core 210 may register with failure detector module 112. Failure detector module 112 may implement a watchdog timer 206 that may expect periodic watchdog signals from each of the registered firmware threads/cores 210. If watchdog timer 206 does not receive a periodic watchdog signal from a registered firmware thread 210, then failure detector module 112 may identify a firmware failure and update a boot address 218. The firmware failure may cause storage device 104 to stop responding to host commands. By updating boot address 218, failure detector module 112 may provide an indication to a recovery routine 214 to load and run recovery firmware 216 on the next power cycle of storage device 104. Failure detector module 112 may trigger an interrupt signal to controller 108 for controller 108 to execute recovery routine 214. Recovery routine 214 may perform a controller reset, i.e., a power cycle initiated by storage device 104.

When storage device 104 is restarted a boot loader may use the updated boot address 218 rather than the normal firmware boot address to locate recovery firmware 216 needed to restart storage device 104. Recovery module 114 may obtain a light mount of the recovery firmware 216 associated with updated boot address 218 from memory device 110 and the boot loader may load the recovery firmware 216 into a controller memory, for example, RAM 106. In some instances, the light mount of recovery firmware 216 may be a different firmware image that is saved in a code execution area for recovery and log purposes. Recovery module 114 may switch the code execution to the light mount of recovery firmware 216 to boot up with the recovery image.

When recovery module 114 obtains a light mount of recovery firmware 216, the boot loader may perform minimum mount operations to enable storage device 104 enumeration and communication with host 102 so that host 102 can read stored data. Using the light mount of recovery firmware 216, the boot loader may reboot storage device 104 in a recovery mode. Thus, during operation of storage device 104, if firmware running on controller 108 stops working due to an unexpected situation, failure detector module 112 may be able to detect the firmware failure and boot storage device 104 in a recovery mode.

If storage device 104 becomes undetectable because of a failure during initialization or during mount operations within storage device 104, storage device 104 may trigger continuous resets due to the failure, even before the watchdog timer detects a missing signal from firmware threads 210. When initialization firmware 212 begins execution, initialization firmware 212 may send an update to failure detector module 112 about a failure during initialization. An event handler 202 within failure detector module 112 may note the initialization event by, for example, incrementing an initialization counter 220 (shown as INIT counter 220) to indicate the number of times storage device 104 has been initialized without moving into an operational state. INIT counter 220 may be reset when the watchdog module receives the watchdog signal from firmware threads 210. If INIT counter 220 value exceeds an initialization threshold, failure detector module 112 may update firmware boot address 218 to point to recovery firmware 216. Failure detector module 112 may trigger an interrupt signal to controller 108 for controller 108 to execute recovery routine 214 to perform a controller reset.

In some cases, storage device 104 may be successfully mounted and detected by host 102. However, after host 102 starts read/write operations an unexpected situation may occur within storage device 104. For example, after firmware threads 210 send the watchdog signals, an unexpected situation may occur during the firmware execution, leading controller firmware 208 to trigger a controller reset. If this process keeps repeating, host 102 may be unable to communicate with storage device 104 for prolonged periods.

When firmware on storage device 104 fails, host 102 may power cycle storage device 104. Failure detector module 112 may record the time between successive power cycles and after a predefined number of back-to-back power cycles of storage device 104, failure detector module 112 may determine that a failure has occurred and trigger an interrupt signal to controller 108 for controller 108 to execute recovery routine 214 to perform a controller reset.

A real-time clock (RTC) module 204 may receive a notification for an initialization event from INIT firmware 212 whenever storage device 104 boots up. RTC module 204 may measure the time between two boot up events. If this time is below a boot threshold, then failure detector module 112 may determine that the power cycle is not because of firmware failure. If based on the notifications, failure detector module 112 determines that a number of power cycle events above a startup threshold have occurred within a given time period, failure detector module 112 may determine that the power cycle is because of firmware failure and update firmware boot address 218 to point to recovery firmware 216. For example, if failure detector module 112 determines that a predefined number of power cycle events have occurred within quick succession within the given time period, failure detector module 112 may determine that the power cycle is because of firmware failure and update firmware boot address 218 to point to recovery firmware 216. Failure detector module 112 may trigger an interrupt signal to controller 108 for controller 108 to execute recovery routine 214 to perform a controller reset. In recovery mode, recovery routine 214 may notify controller firmware 208 to query host 102 and confirm if the power cycle was expected. If host 102 confirms that the power cycle was expected, then storage device 104 may switch back to the normal initialization firmware and resume its operations. If host 102 confirms that the power cycle was unexpected, then recovery actions may occur.

As part of the recovery actions, when storage device 104 detects a problematic situation and boots up into a recovery mode using recovery firmware 216, storage device 104 may perform phased recovery actions. In a first recovery phase, storage device 104 may execute a light mount of recovery firmware 216 and enter a temporary read-only mode to enable host 102 to back-up data stored on storage device 104. In a second recovery phase, recovery firmware 216 may be used to restore storage device 104 to normal operations.

In the first recovery phase, recovery module 114 may perform minimum mount operations (also referred to herein as light mount) to enable storage device 104 enumeration, communication with host 102, and to allow read access to stored data. Storage device 104 may enter a temporary read-only state, wherein host 102 may access the data stored on storage device 104 and take a copy, if needed. Recovery module 114 may load logical-to-physical mapping tables during the light mount to enable host 102 to read the data stored on storage device 104. During the light mount, features that are likely to malfunction and cause one or more firmware in storage device 104 to halt execution may not be loaded and initialized as part of the boot sequence. For example, features such as compaction, Enhanced-Post-Write-Read (EPWR), wear leveling, read scrubbing, data retention checks, folding, and relinking may be disable and these features may not be loaded and initialized as part of the boot sequence. Some of the hardware protocols may also be disabled. For example, features such as data coherency test and aggregation features, garbage collection or other hardware protocols which may aid in performance or that are required only in the write path may also be disabled. After the light mount, storage device 104 may allow host 102 to obtain a copy of the data stored on storage device 104 by enabling read commands.

When host 102 backs up the data, storage device 104 may enter the second recovery phase and exit the temporary read-only mode to allow normal read/write operations, thereby executing a first recovery attempt to return an inoperable storage device 104 to normalcy. If the first recovery attempt fails and storage device 104 again becomes undetectable or enters a brick stat, then storage device 104 may perform a second recovery attempt by dumping/sending the logical-to-physical tables to the host 102. Storage device 104 may avoid writing within storage device 104 so that an erroneous condition may likely not be reencountered. Controller 108 may perform secure erase of the logical mappings in storage device 104 and clean up firmware bookkeeping information. The secure erase may not delete the data physically stored on storage device 104. Occupied meta blocks may be freed and storage device 104 state may be restored to a factory state. Controller 108 may retrieve the logical-to-physical tables from host 102, store them on storage device 104, and allow the normal read/write operations.

In both the first and/or second recovery attempts, storage device 104 may choose to disallow normal host operations and request host 102 to perform a field firmware upgrade before processing any further host operations. In the light mount recovery mode, storage device 104 may support the field firmware upgrade, wherein storage device 104 may prompt host 102 to perform the field firmware upgrade as the version to which host 102 may upgrade may potentially fix for the issue causing the firmware to fail. Once the field firmware upgrade is completed, on boot up, storage device 104 may switch to normal mode and re-enable all the features and mount all firmware modules needed for full operations (for example, host read, writes, and/or erase). Even if the field firmware upgrade does not include a fix for the problem encounter, it is possible that the failure may not reoccur because most of the firmware schemes may have been reset.

When storage device 104 is worn out and nearing an end-of-life status, the program-erase-count (PEC) of storage device 104 may be high. When the PEC count is high, chances that a firmware issue may be due to unexpected or unhandled memory failures or incorrect handling of exception situations in the firmware may be high. Thus, in such cases, controller 108 may perform a physical erase to refresh the meta blocks. The physical erase may be performed after host 102 has obtained a copy of the data while the storage device 104 was in the temporary read-only mode.

Once recovery is performed, aggressive device health check schemes may be adopted on storage device 104. For example, aggressive active scan frequency, EPWR on more wordlines, etc. may be adopted on storage device 104. Assuming a firmware issue fix is not found and the condition of storage device 104 was due to unexpected memory behavior, if the health of storage device 104 is found to be bad, and the same situation may occur where storage device

104 becomes inoperable, then the end of life may be preponed and host 102 may be notified. In some cases, controller 108 may have different light mount firmware options for recovery of storage device 104 based on the average PEC of memory device 110, where the age and wear out of the flash may determine the recovery mechanism.

Storage device 104 may be a multi-protocol device, for example, secure digital (SD)-peripheral component interconnect express (PCI Express or PCIe (i.e., a SD-PCIe device), SD plus Non-Volatile Memory Express (NVMe) device, or universal serial bus (USB) plus NVMe device. A multiple protocol storage device 104, may perform recovery in a mode/protocol where the failure did not occur. For example, in a USB-NVMe device, if the failure occurred in USB mode, then recovery firmware will be operational in NVMe mode, and vice-versa. In some cases, storage device 104 may have different light mount firmware options based on the mode of operation in a multi-protocol storage device 104. For example, storage device 104 may perform recovery always in one mode irrespective of the mode in which the error occurred.

Storage device 104 may perform these processes based on a processor, for example, controller 108 executing software instructions stored by a non-transitory computer-readable medium, such as storage component 110. As used herein, the term "computer-readable medium" refers to a non-transitory memory device. Software instructions may be read into storage component 110 from another computer-readable medium or from another device. When executed, software instructions stored in storage component 110 may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. Controller 108 may include additional components (not shown in this figure for the sake of simplicity). FIG. 2 is provided as an example. Other examples may differ from what is described in FIG. 2.

Figure 3:
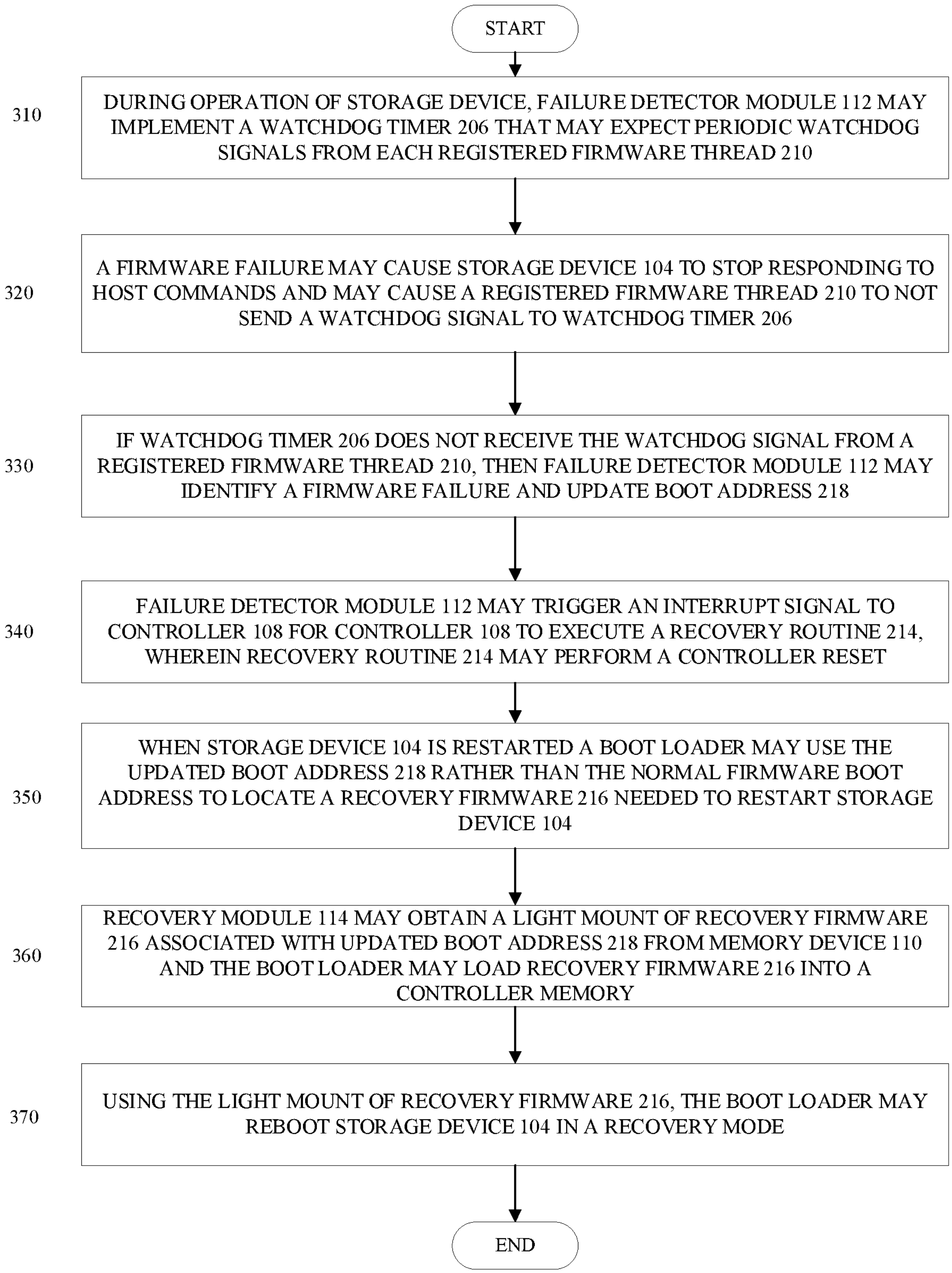
FIG. 3 is a flow diagram of an exemplary process for recovering the storage device when the storage device is not responding to host commands in accordance with some implementations.

FIG. 3 is a flow diagram of an exemplary process for recovering the storage device when the storage device is not responding to host commands in accordance with some implementations. At 310, during operation of storage device, failure detector module 112 may implement a watchdog timer 206 that may expect periodic watchdog signals from each registered firmware thread 210. At 320, a firmware failure may cause storage device 104 to stop responding to host commands and may cause a registered firmware thread 210 to not send a watchdog signal to watchdog timer 206. At 330, if watchdog timer 206 does not receive the watchdog signal from a registered firmware thread 210, then failure detector module 112 may identify a firmware failure and update boot address 218. At 340, failure detector module 112 may trigger an interrupt signal to controller 108 for controller 108 to execute a recovery routine 214, wherein recovery routine 214 may perform a controller reset.

At 350, when storage device 104 is restarted a boot loader may use the updated boot address 218 rather than the normal firmware boot address to locate a recovery firmware 216 needed to restart storage device 104. At 360, recovery module 114 may obtain a light mount of recovery firmware 216 associated with updated boot address 218 from memory device 110 and the boot loader may load recovery firmware 216 into a controller memory. At 370, using the light mount of recovery firmware 216, the boot loader may reboot storage device 104 in a recovery mode. FIG. 3 is provided as an example. Other examples may differ from what is described in FIG. 3.

Figure 4:
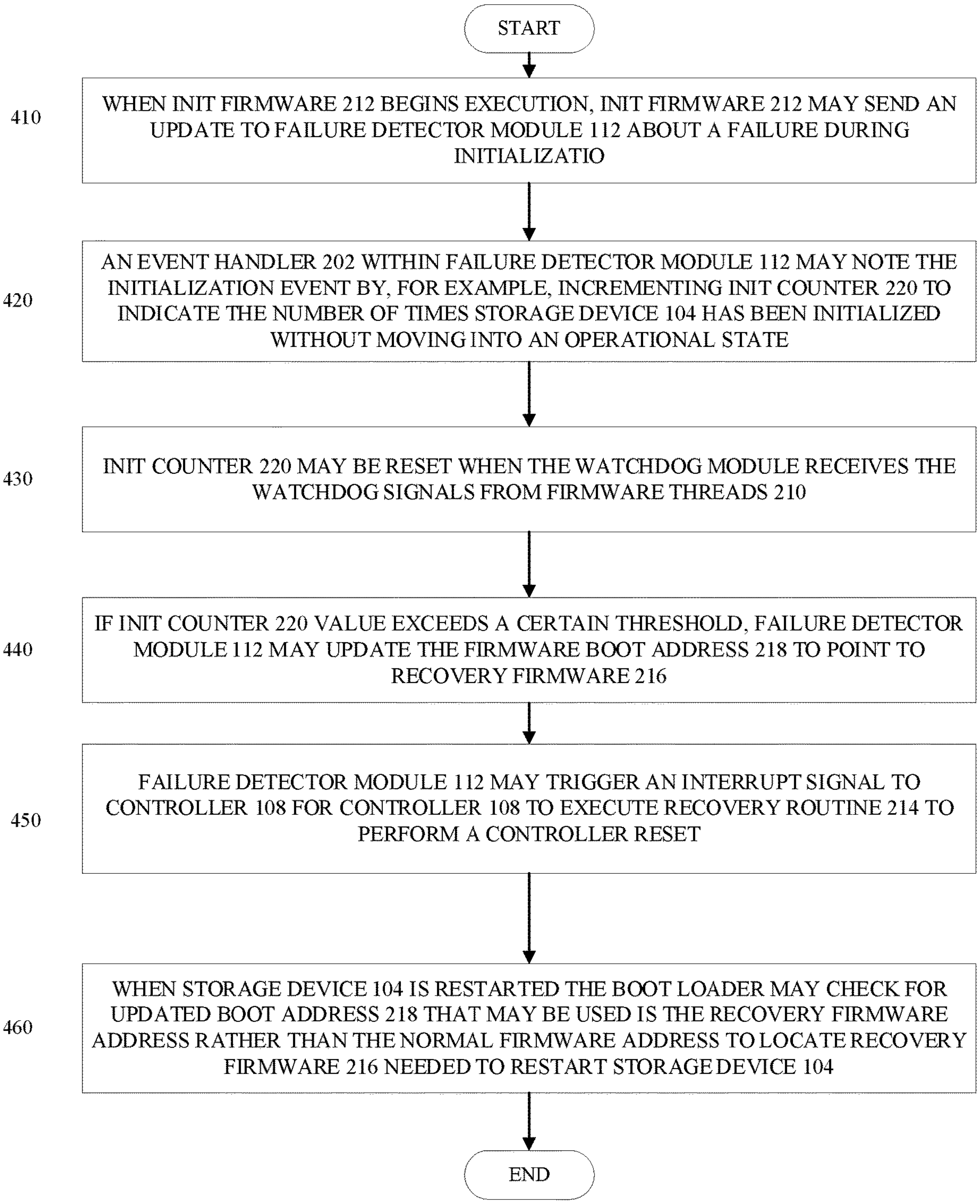
FIG. 4 is a flow diagram of an exemplary process for recovering the storage device during an initialization or mount failure within the storage device in accordance with some implementations.

FIG. 4 is a flow diagram of an exemplary process for recovering the storage device during an initialization or mount failure within the storage device in accordance with some implementations. At 410, when initialization firmware 212 begins execution, initialization firmware 212 may send an update to failure detector module 112 about a failure during initialization. At 420, an event handler 202 within failure detector module 112 may note the initialization event by, for example, incrementing INIT counter 220 to indicate the number of times storage device 104 has been initialized without moving into an operational state. At 430, INIT counter 220 may be reset when the watchdog module receives the watchdog signals from firmware threads 210. At 440, if INIT counter 220 value exceeds a certain threshold, failure detector module 112 may update the firmware boot address 218 to point to recovery firmware 216. At 450, failure detector module 112 may trigger an interrupt signal to controller 108 for controller 108 to execute recovery routine 214 to perform a controller reset. At 460, when storage device 104 is restarted the boot loader may check for updated boot address 218 that may be used is the recovery firmware address rather than the normal firmware address to locate recovery firmware 216 needed to restart storage device 104. FIG. 4 is provided as an example. Other examples may differ from what is described in FIG. 4.

Figure 5:
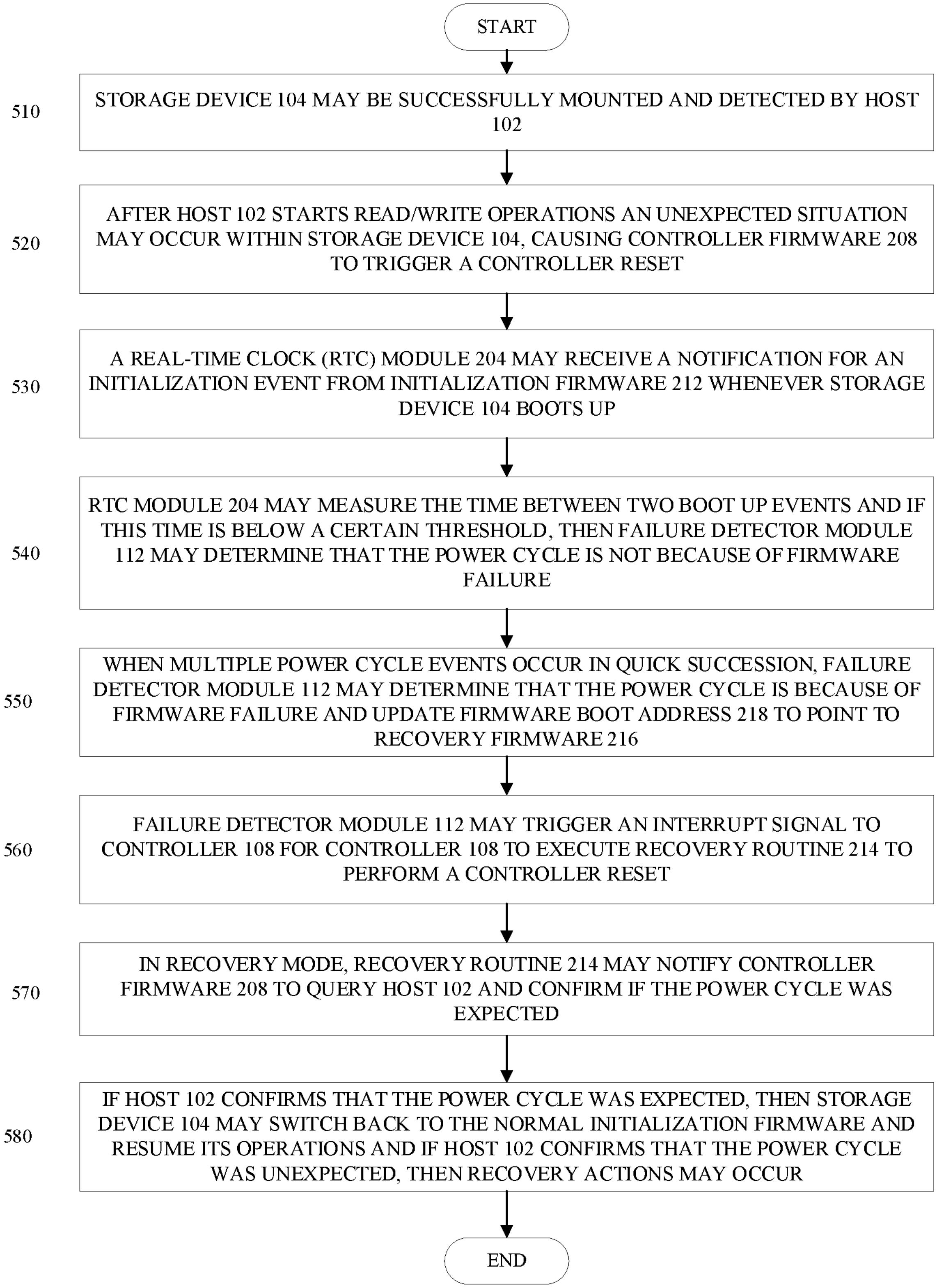
FIG. 5 is a flow diagram of an exemplary process for recovering the storage device when an unexpected storage device reset occurs after the storage device is detected by the host in accordance with some implementations.

FIG. 5 is a flow diagram of an exemplary process for recovering the storage device when an unexpected storage device reset occurs after the storage device is detected by the host and issues watchdog signals in accordance with some implementations. At 510, storage device 104 may be successfully mounted and detected by host 102. At 520, after host 102 starts read/write operations an unexpected situation may occur within storage device 104, causing controller firmware 208 to trigger a controller reset. At 530, a real-time clock (RTC) module 204 may receive a notification for an initialization event from initialization firmware 212 whenever storage device 104 boots up. At 540, RTC module 204 may measure the time between two boot up events and if this time is below a certain threshold, then failure detector module 112 may determine that the power cycle is not because of firmware failure. At 550, when multiple power cycle events occur in quick succession, failure detector module 112 may determine that the power cycle is because of firmware failure and update firmware boot address 218 to point to recovery firmware 216. At 560, failure detector module 112 may trigger an interrupt signal to controller 108 for controller 108 to execute recovery routine 214 to perform a controller reset. At 570, in recovery mode, recovery routine 214 may notify controller firmware 208 to query host 102 and confirm if the power cycle was expected. At 580, if host 102 confirms that the power cycle was expected, then storage device 104 may switch back to the normal initialization firmware and resume its operations and if host 102 confirms that the power cycle was unexpected, then recovery actions may occur. FIG. 5 is provided as an example. Other examples may differ from what is described in FIG. 5.

Figure 6:
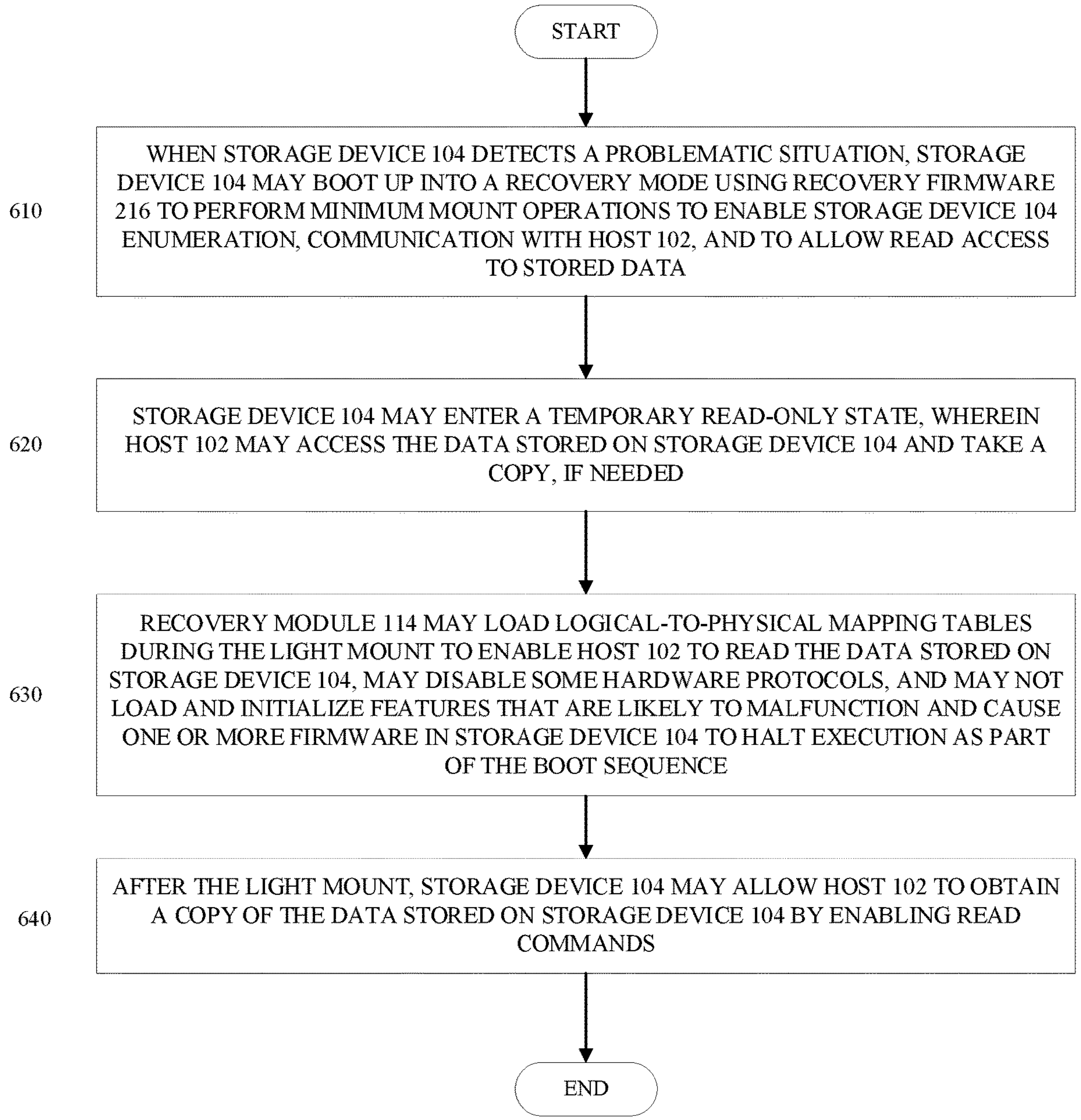
FIG. 6 is a flow diagram of an exemplary first recovery phase for recovering the storage device in accordance with some implementations.

FIG. 6 is a flow diagram of an exemplary first recovery phase for recovering the storage device in accordance with some implementations. At 610, when storage device 104 detects a problematic situation, storage device 104 may boot up into a recovery mode using recovery firmware 216 to perform minimum mount operations to enable storage device 104 enumeration, communication with host 102, and to allow read access to stored data. At 620, storage device

104 may enter a temporary read-only state, wherein host 102 may access the data stored on storage device 104 and take a copy, if needed. At 630, recovery module 114 may load logical-to-physical mapping tables during the light mount to enable host 102 to read the data stored on storage device 104, may disable some hardware protocols, and may not load and initialize features that are likely to malfunction and cause one or more firmware in storage device 104 to halt execution as part of the boot sequence. At 640, after the light mount, storage device 104 may allow host 102 to obtain a copy of the data stored on storage device 104 by enabling read commands. FIG. 6 is provided as an example. Other examples may differ from what is described in FIG. 6.

Figure 7:
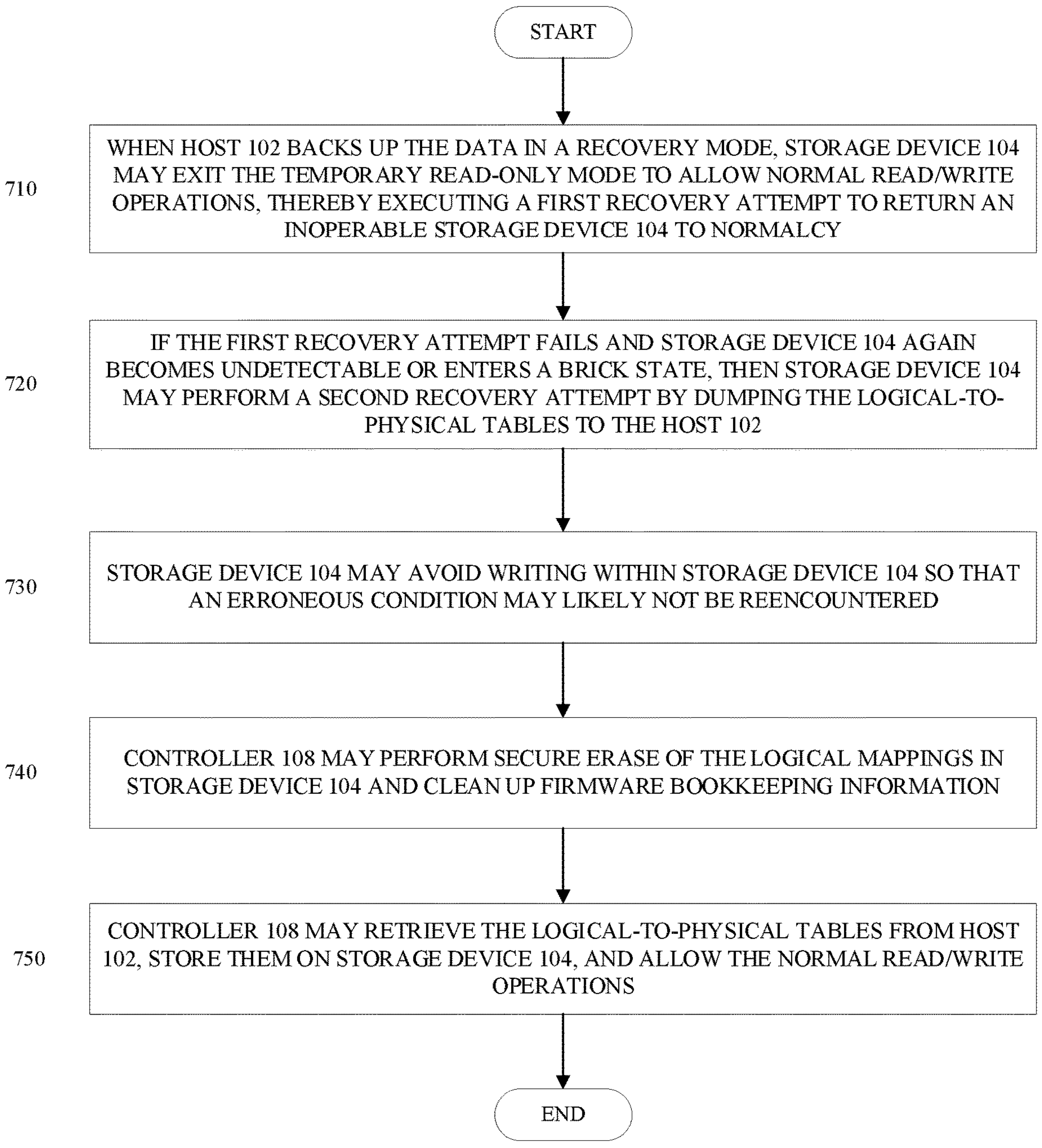
FIG. 7 is a flow diagram of an exemplary second recovery phase for recovering the storage device in accordance with some implementations.

FIG. 7 is a flow diagram of an exemplary second recovery phase for recovering the storage device in accordance with some implementations. At 710, when host 102 backs up the data in a recovery mode, storage device 104 may exit the temporary read-only mode to allow normal read/write operations, thereby executing a first recovery attempt to return an inoperable storage device 104 to normalcy. At 720, if the first recovery attempt fails and storage device 104 again becomes undetectable or enters a brick state, then storage device 104 may perform a second recovery attempt by dumping the logical-to-physical tables to the host 102. At 730, storage device 104 may avoid writing within storage device 104 so that an erroneous condition may likely not be reencountered. At 740, controller 108 may perform secure erase of the logical mappings in storage device 104 and clean up firmware bookkeeping information. At 750, controller 108 may retrieve the logical-to-physical tables from host 102, store them on storage device 104, and allow the normal read/write operations. FIG. 7 is provided as an example. Other examples may differ from what is described in FIG. 7.

Figure 8:
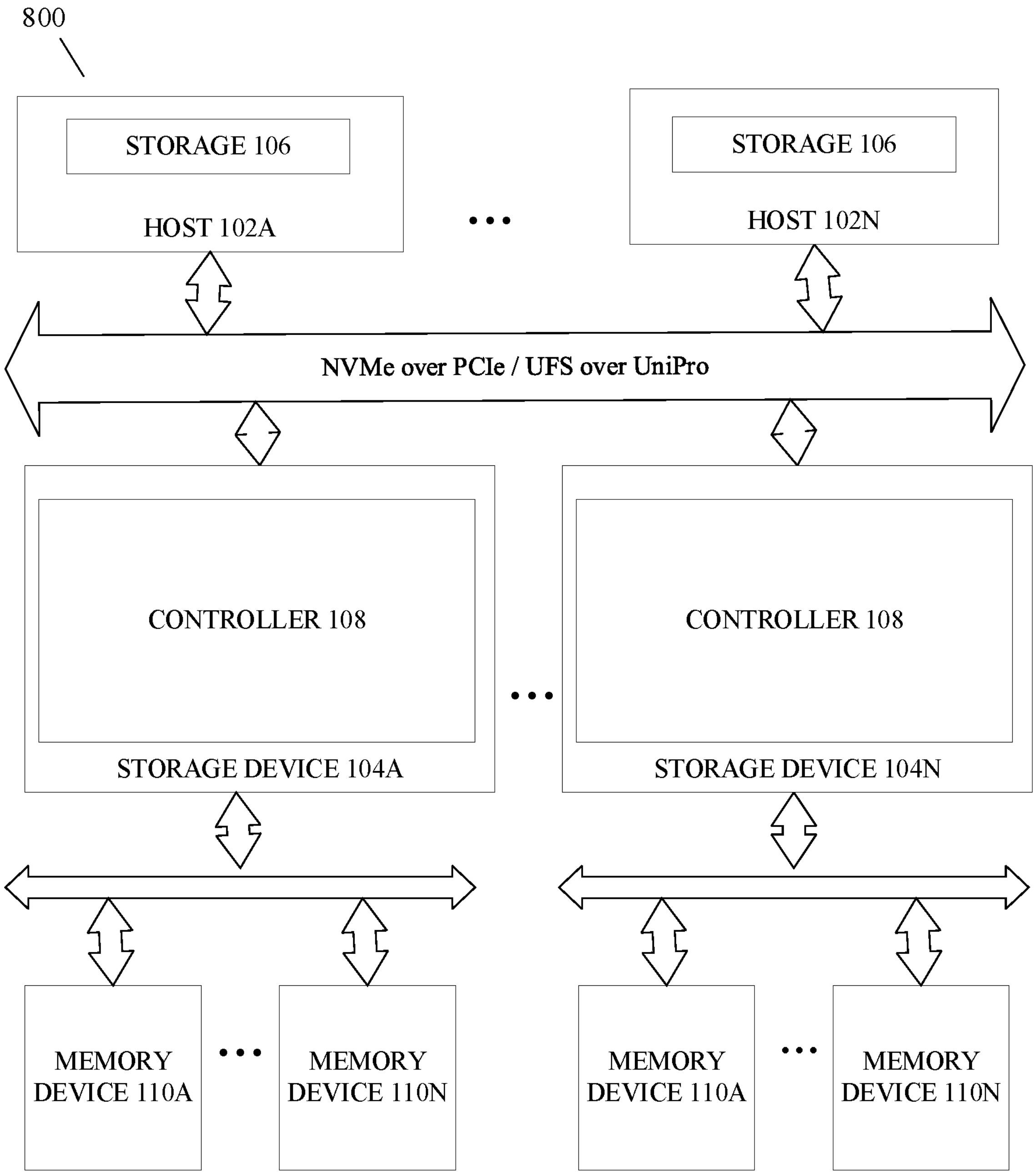
FIG. 8 is a diagram of an example environment in which systems and/or methods described herein are implemented.

FIG. 8 is a diagram of an example environment in which systems and/or methods described herein are implemented. As shown in FIG. 8, Environment 800 may include hosts **102-102*n* (referred to herein as host(s) 102), and storage devices 104*a*-104*n* (referred to herein as storage device(s) 104**).

Storage device 104 may include a controller 108 to manage the resources on storage device 104 and to reset storage device 104 when there is a firmware failure. Hosts 102 and storage devices 104 may communicate via Non-Volatile Memory Express (NVMe) over peripheral component interconnect express (PCI Express or PCIe) standard, the Universal Flash Storage (UFS) over Unipro, or the like.

Devices of Environment 800 may interconnect via wired connections, wireless connections, or a combination of wired and wireless connections. For example, the network of FIG. 8 may include a cellular network (e.g., a long-term evolution (LTE) network, a code division multiple access (CDMA) network, a 3G network, a 4G network, a 5G network, another type of next-generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 8 are provided as an example. In practice, there may be additional devices and/or networks, fewer devices and/or networks, different devices and/or networks, or differently arranged devices and/or networks than those shown in FIG. 8. Furthermore, two or more devices shown in FIG. 8 may be implemented within a single device, or a single device shown in FIG. 8 may be implemented as multiple, distributed devices. Additionally, or alternatively, a set of devices (e.g., one or more devices) of Environment 800 may perform one or more functions described as being performed by another set of devices of Environment 800.

Figure 9:
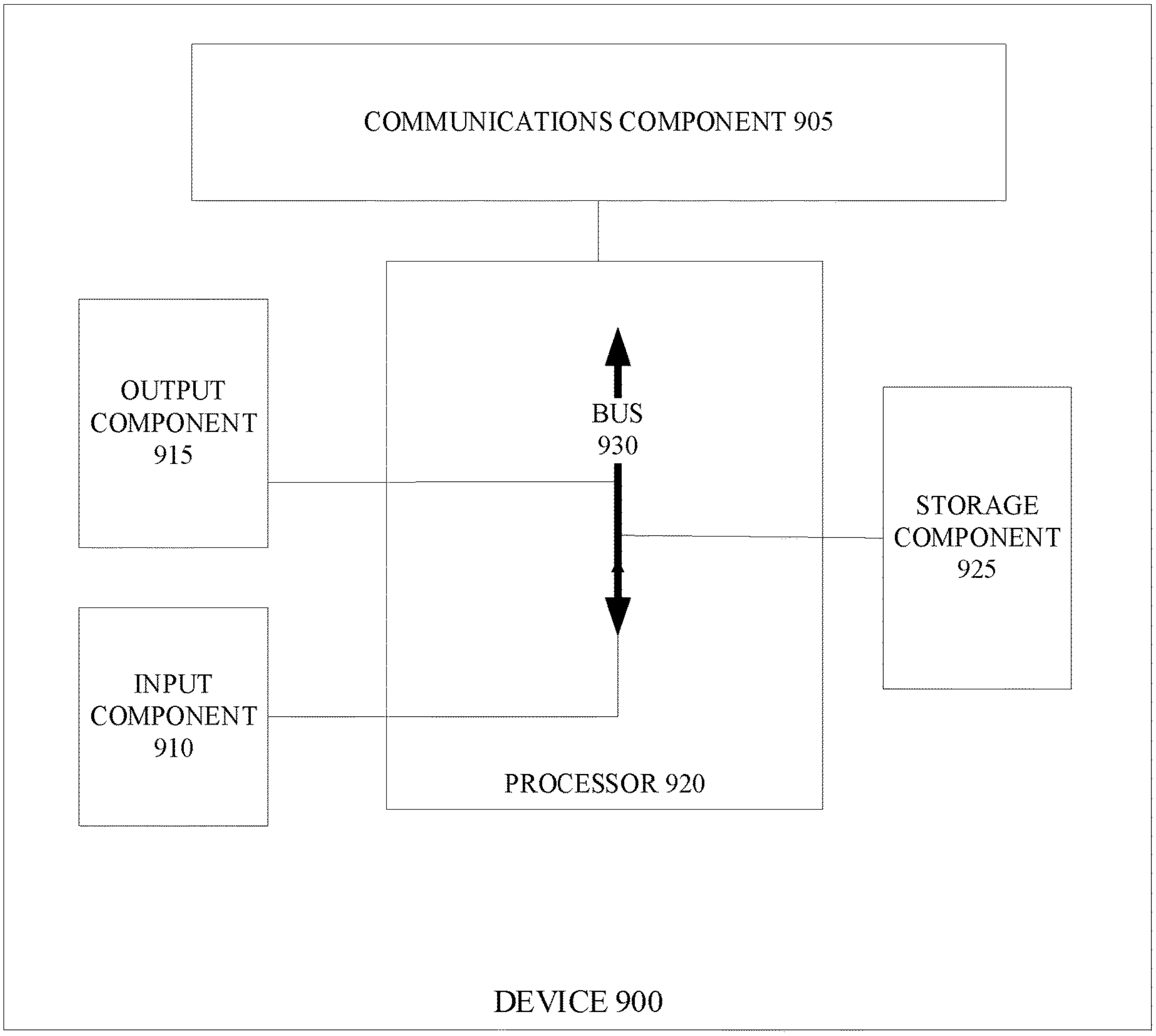
FIG. 9 is a diagram of example components of one or more devices of FIG. 1.

FIG. 9 is a diagram of example components of one or more devices of FIG. 1. In some implementations, host 102 may include one or more devices 900 and/or one or more components of device 900. Device 900 may include, for example, a communications component 905, an input component 910, an output component 915, a processor 920, a storage component 925, and a bus 930. Bus 930 may include components that enable communication among multiple components of device 900, wherein components of device 900 may be coupled to be in communication with other components of device 900 via bus 930.

Input component 910 may include components that permit device 900 to receive information via user input (e.g., keypad, a keyboard, a mouse, a pointing device, a microphone, and/or a display screen), and/or components that permit device 900 to determine the location or other sensor information (e.g., an accelerometer, a gyroscope, an actuator, another type of positional or environmental sensor). Output component 915 may include components that provide output information from device 900 (e.g., a speaker, display screen, and/or the like). Input component 910 and output component 915 may also be coupled to be in communication with processor 920.

Processor 920 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 920 may include one or more processors capable of being programmed to perform a function. Processor 920 may be implemented in hardware, firmware, and/or a combination of hardware and software.

Storage component 925 may include one or more memory devices, such as random-access memory (RAM) 106, read-only memory (ROM), and/or another type of dynamic or static storage device (e.g., a flash memory, a magnetic memory, and/or optical memory) that stores information and/or instructions for use by processor 920. A memory device may include memory space within a single physical storage device or memory space spread across multiple physical storage devices. Storage component 925 may also store information and/or software related to the operation and use of device 900. For example, storage component 925 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Communications component 905 may include a transceiver-like component that enables device 900 to communicate with other devices, such as via a wired connection, a wireless connection, or a combination of wired and wireless connections. The communications component 905 may permit device 900 to receive information from another device and/or provide information to another device. For example, communications component 905 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 905 may also include one or more broadband and/or narrowband transceivers and/or other similar types of wireless transceiver configurable to communicate via a wireless network for infrastructure communications. Communications component 905 may also include one or more local area network or personal area network transceivers, such as a Wi-Fi transceiver or a Bluetooth transceiver.

Device 900 may perform one or more processes described herein. For example, device 900 may perform these processes based on processor 920 executing software instructions stored by a non-transitory computer-readable medium, such as storage component 925. As used herein, the term "computer-readable medium" refers to a non-transitory memory device. Software instructions may be read into storage component 925 from another computer-readable medium or from another device via communications component 905. When executed, software instructions stored in storage component 925 may cause processor 920 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 9 are provided as an example. In practice, device 900 may include additional components, fewer components, different components, or differently arranged components than those shown in FIG. 9. Additionally, or alternatively, a set of components (e.g., one or more components) of device 900 may perform one or more functions described as being performed by another set of components of device 900.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device recovers from a firmware failure that places the storage device in an undetectable state, the storage device comprises:

a memory device to store recovery firmware; and a controller including:

a failure detector module that identifies a firmware failure when one of a periodic signal is not received by the failure detector module from a firmware thread, an initialization counter value is greater than an initialization threshold, and a notification is received of a predefined number of power cycle events occurring with a given time frame; and that updates a boot address, and a recovery module to obtain a light mount recovery firmware from the memory device, based on the boot address, to use the light mount of the recovery firmware to recover the storage device in a recovery mode and perform phased recovery actions to restart the storage device, wherein the failure detector module further comprises a watchdog timer to receive periodic signals from firmware threads, wherein the failure detector module triggers an interrupt signal to the controller to execute a recovery routine when the failure detector module identifies the firmware failure.

2. The storage device of claim 1, wherein the controller comprises a boot loader to use an updated boot address to locate the light mount of the recovery firmware and to use the light mount of the recovery firmware to restart the storage device in the recovery mode.

3. The storage device of claim 1, further comprising an initialization firmware to send an update to the failure detector module about a failure during initialization, wherein an event handler in the failure detector module increments the initialization counter when the storage device has been initialized without moving into an operational state.

4. The storage device of claim 1, wherein the failure detector module records a time between successive host power cycles of the storage device and after a predefined number of successive power cycles of the storage device, the failure detector module determines that a failure has occurred and triggers an interrupt signal to the controller for the controller to execute a recovery routine to perform a controller reset.

5. The storage device of claim 1, further comprising a real-time clock module to receive the notification for an initialization event from an initialization firmware whenever the storage device boots up.

6. The storage device of claim 1, wherein in the recovery mode, the controller queries a host to confirm if a power cycle is expected by the host, and if it is, the storage device switches to a normal initialization firmware and resumes operations, and if it is not, the controller performs the phased recovery actions.

7. The storage device of claim 1, wherein the phased recovery actions include a first recovery phase wherein the storage device executes a light mount of the recovery firmware and enters a temporary read-only mode to enable a host to back-up data stored on the storage device.

8. The storage device of claim 1, wherein the phased recovery actions include a second recovery phase wherein the storage device executes a first recovery attempt by exiting a read-only mode to allow read and write operations, wherein if the first recovery attempt fails, the storage device executes a second recovery attempt by sending 1 logical-to-physical tables to a host, erasing the logical-to-physical tables on the storage device, and retrieving the logical-to-physical tables from the host to allow the read and write operations.

9. The storage device of claim 8, wherein when at least one of the first recovery attempt and the second recovery attempt fails, the storage device disallows normal host operations, requests the host to perform a field firmware upgrade and boots up in a normal mode.

10. The storage device of claim 1, wherein when a program-erase-count of the storage device is high, the controller performs a physical erase to refresh meta blocks, wherein the controller executes different light mount firmware options for recovery of the storage device based on an average program-erase-count of the memory device, wherein age and wear out of the memory device determines a recovery mechanism.

11. The storage device of claim 1, wherein the storage device is a multi-protocol storage device that one of performs recovery in a protocol where failure did not occur and includes different light mount firmware options and performs recovery based on a mode of operation.

12. A method in a storage device for recovering from a firmware failure that places the storage device in an undetectable state, the storage device comprises a controller to perform the method comprising:

receiving, by a watchdog timer, periodic signals from firmware threads;

identifying a firmware failure when one of a periodic signal is not received by a failure detector module from a firmware thread, an initialization counter value is greater than an initialization threshold, and a notification is received of a predefined number of power cycle events occurring with a given time frame;

triggering an interrupt signal to the controller to execute a recovery routine when the failure detector module identifies the firmware failure;

updating a boot address;

obtaining a light mount of recovery firmware from a memory device based on an updated boot address;

recovering the storage device in a recovery mode with the light mount of the recovery firmware; and performing phased recovery actions to restart the storage device.

13. The method of claim 12, further comprising sending an update to the failure detector module about a failure during initialization and incrementing the initialization counter when the storage device has been initialized without moving into an operational state.

14. The method of claim 12, further comprising recording a time between successive host power cycles of the storage device, and after a predefined number of successive power cycles of the storage device, determining that a failure has occurred and triggering an interrupt signal to execute a recovery routine to perform a controller reset.

15. The method of claim 12, wherein the phased recovery actions comprise a first recovery phase including executing the light mount of the recovery firmware and entering a temporary read-only mode to enable a host to back-up data stored on the storage device.

16. The method of claim 12, wherein the phased recovery actions comprise a second recovery phase including executing a first recovery attempt by exiting a read-only mode to allow read and write operations, and if the first recovery attempt fails, executing a second recovery attempt by sending logical-to-physical tables to a host, erasing the logical-to-physical tables on the storage device, and retrieving the logical-to-physical tables from the host to allow read and write operations.

17. The method of claim 12, wherein when a program-erase-count of the storage device is high, the method comprises performing a physical erase to refresh meta blocks and executing different light mount firmware options for recovery of the storage device based on an average program-erase-count of the memory device.

18. The method of claim 12, wherein the storage device is a multi-protocol storage device, and the method comprises performing one of recovery in a protocol where failure did not occur and based on a mode of operation.

19. A method in a storage device for recovering from a firmware failure that places the storage device in an undetectable state, the storage device comprises a controller to perform the method comprising:

identifying a firmware failure when one of a periodic signal is not received by a failure detector module from a firmware thread, an initialization counter value is greater than an initialization threshold, and a notification is received of a predefined number of power cycle events occurring with a given time frame;

updating a boot address;

obtaining recovery firmware from a memory device based on an updated boot address;

recovering the storage device in a recovery mode with the recovery firmware;

executing a light mount of the recovery firmware to restart the storage device and enter a temporary read-only mode to enable a host to back-up data stored on the storage device; and executing a first recovery attempt by exiting a read-only mode to allow read and write operations, and if the first recovery attempt fails, executing a second recovery attempt by sending logical-to-physical tables to a host, erasing the logical-to-physical tables on the storage device, and retrieving the logical-to-physical tables from the host to allow read and write operations.

* * * * *